United States Patent [19]

Tervola

[11] Patent Number: 4,718,508
[45] Date of Patent: Jan. 12, 1988

[54] DRIVING AND STEERING SYSTEM

[76] Inventor: Pentti J. Tervola, 3663 Lakewood Rd., Lake Worth, Fla. 33461

[21] Appl. No.: 831,429

[22] Filed: Feb. 20, 1986

[51] Int. Cl.[4] ............................................. B62D 11/14
[52] U.S. Cl. ................................ 180/6.44; 74/665 T; 74/674; 180/149
[58] Field of Search ........................ 180/6.2, 6.24, 6.26, 180/6.3, 6.28, 6.44, 7.1, 149; 74/665 S, 665 T, 674, 675, 687, 718, 720.5

[56] References Cited

U.S. PATENT DOCUMENTS

| | | | |
|---|---|---|---|
| 1,395,004 | 10/1921 | Norelins | 74/665 T |
| 1,483,959 | 2/1924 | Welch | 180/6.24 |
| 2,027,218 | 1/1936 | Armington | 180/6.44 |
| 2,196,368 | 4/1940 | Thomson | 74/675 |
| 3,159,084 | 12/1964 | Zeigler | 180/149 |
| 3,395,671 | 8/1968 | Zimmerman | 180/6.44 |
| 3,450,218 | 6/1969 | Looker | 180/6.44 |
| 3,530,741 | 9/1970 | Charest | 74/675 |
| 4,344,498 | 8/1982 | Lindfors | 180/168 |
| 4,471,669 | 9/1984 | Seaberg | 74/687 |

*Primary Examiner*—John J. Love
*Assistant Examiner*—Everett G. Diederiks, Jr.
*Attorney, Agent, or Firm*—Renner, Otto, Boisselle & Lyon

[57] ABSTRACT

A driving and steering system for a vehicle having at least two propelling tracks or wheels driven by output shafts from within a housing containing respective planetary gear sets, each planetary gear set including a sun gear element, a planet gear-carrier element, and a ring gear element. A power-driven shaft between the planetary gear sets has driving engagement with both of the sun gear or the planet gear-carrier elements, and the respective output shafts are driven by the other one of the sun gear or planet gear-carrier elements. A steering shaft is operatively engaged with the ring gear elements to hold them against rotation for straight line propulsion of the vehicle or to rotate them in opposite directions for steering of the vehicle. The steering shaft is actuated by a steering wheel through the intermediary of a bi-directional fluid motor which is energized only when the steering wheel is turned in either direction to steer the vehicle and which is de-energized when turning of the steering wheel is stopped to thereby stop rotation of the steering shaft for continued straight line travel of the vehicle. Optionally, the steering shaft may be actuated by a bi-directional fluid motor which is energized when the steering wheel is turned in either direction from central straight travel position to steer the vehicle and which is de-energized when the steering wheel is returned to central straight travel position.

8 Claims, 9 Drawing Figures

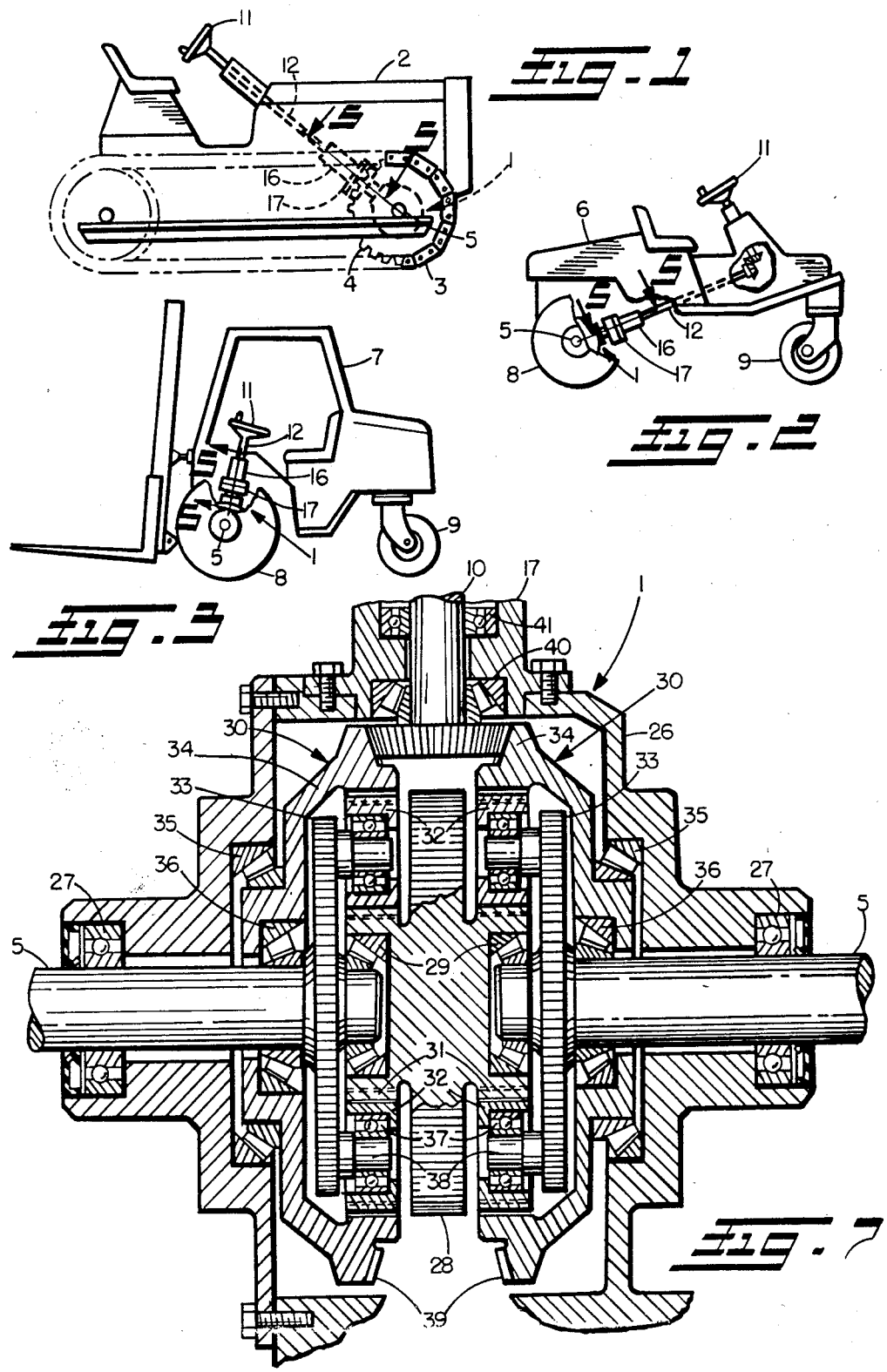

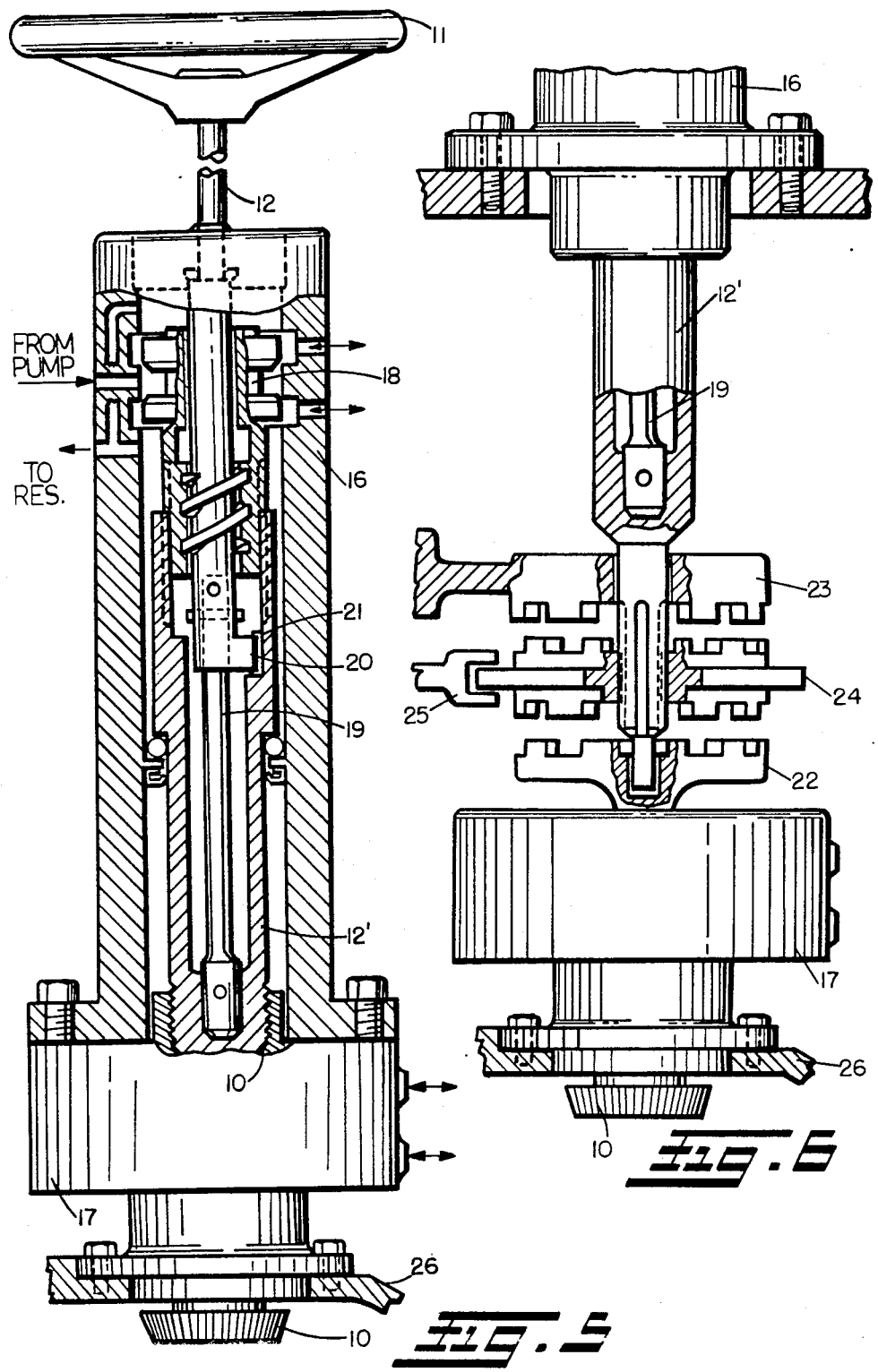

DRIVING AND STEERING SYSTEM

BACKGROUND OF THE INVENTION

It is known to drive and steer tracked vehicles by transmitting power from a power-driven shaft to track sprocket output shafts via respective planetary gear sets, a steering shaft holding one of the sun gear, planet gear-carrier, and ring gear elements of each planetary gear set against rotation for straight travel of the vehicle and rotating said one element of the planetary gear sets in opposite directions for turning the vehicle.

The following U.S. patents exemplify driving and steering systems of this type:

U.S. Pat. Nos. 1,395,004, Oct. 25, 1921, Norelius; 2,196,368, Apr. 9, 1940, Thomson; 3,450,218, June 17, 1969, Looker; 3,530,741, Sept. 29, 1970, Charest; 4,471,669, Sept. 18, 1984, Seaberg.

It is also known to drive and steer army tanks and bulldozers using a power differential and a steering differential which are geared together to increase and decrease the speeds of the sprocket axles when the steering shaft is rotated by an auxiliary motor and worm drive. This system is shown and described in an article entitled "Tanks and dozers turn on a dime with new all-gear steering" on pages 60 to 62 of the July, 1985 issue of "Popular Science".

SUMMARY OF THE INVENTION

A driving and steering system for tracked or wheeled vehicles characterized in the provision of a housing having coaxial output shafts for driving the tracks or wheels of the vehicle; a power-driven member rotatably supported in the housing by bearings on the axially inner end portions of the output shafts; a pair of planetary gear sets straddling the power-driven member and operatively interconnecting the power-driven member with the respective output shafts; each planetary gear set including a sun gear element in driving engagement with either the power-driven member or the respective output shaft, a planet gear-carrier element in driving engagement with the other of the power-driven member and respective output shaft, and a ring gear element rotatably supported in the housing by bearings between the ring gear element and the housing and between the ring gear element and the respective output shaft. The housing rotatably supports a steering shaft which is operatively engaged with the ring gear elements to retain them against rotation for straight line propulsion of the vehicle and to rotate the ring gear elements in opposite directions to increase the speed of one output shaft and to correspondingly decrease the speed of the other output shaft for turning the vehicle.

The driving and steering system is further characterized in that the steering wheel of the vehicle is operatively connected to the steering shaft aforesaid and in that a fluid motor assists in actuation of the steering shaft and is energized responsive to turning of the steering wheel and consequent turning of the vehicle and is de-energized upon stopping of the turning of the steering wheel for continued straight line propulsion of the vehicle.

The driving and steering system is further characterized in that the steering shaft may be driven in desired direction to steer the vehicle by a bi-directional fluid motor which is energized in response to turning of the steering wheel in desired direction and which is de-energized in response to return of the steering wheel to initial straight line propulsion position.

BRIEF DESCRIPTION OF THE DRAWINGS

In the annexed drawings:

FIGS. 1, 2 and 3 are side elevation views of a tracked vehicle (FIG. 1) and wheeled vehicles (FIGS. 2 and 3) respectively, each embodying the present driving and steering system;

FIG. 5 is a cross-section view of a portion of the present driving and steering system taken along line 5—5 of FIGS. 1, 2, and 3 showing a directional control valve operated by the steering wheel of the vehicle for controlling the operation of a bi-directional fluid motor which is operatively connected to the steering shaft of the system;

FIG. 6 is a fragmentary view similar to FIG. 5 except that a clutch mechanism is interposed between the directional control valve and the bi-directional fluid motor to selectively provide manual steering with power assist or power steering alone;

FIG. 7 is a cross-section view of the present driving and steering system constituting a continuation of FIGS. 5 or 6;

FIG. 8 is a cross-section view similar to FIG. 7 illustrating another embodiment of the present driving and steering system.

DETAILED DESCRIPTION OF THE PREFERRED EMBODIMENT

Figure 3:
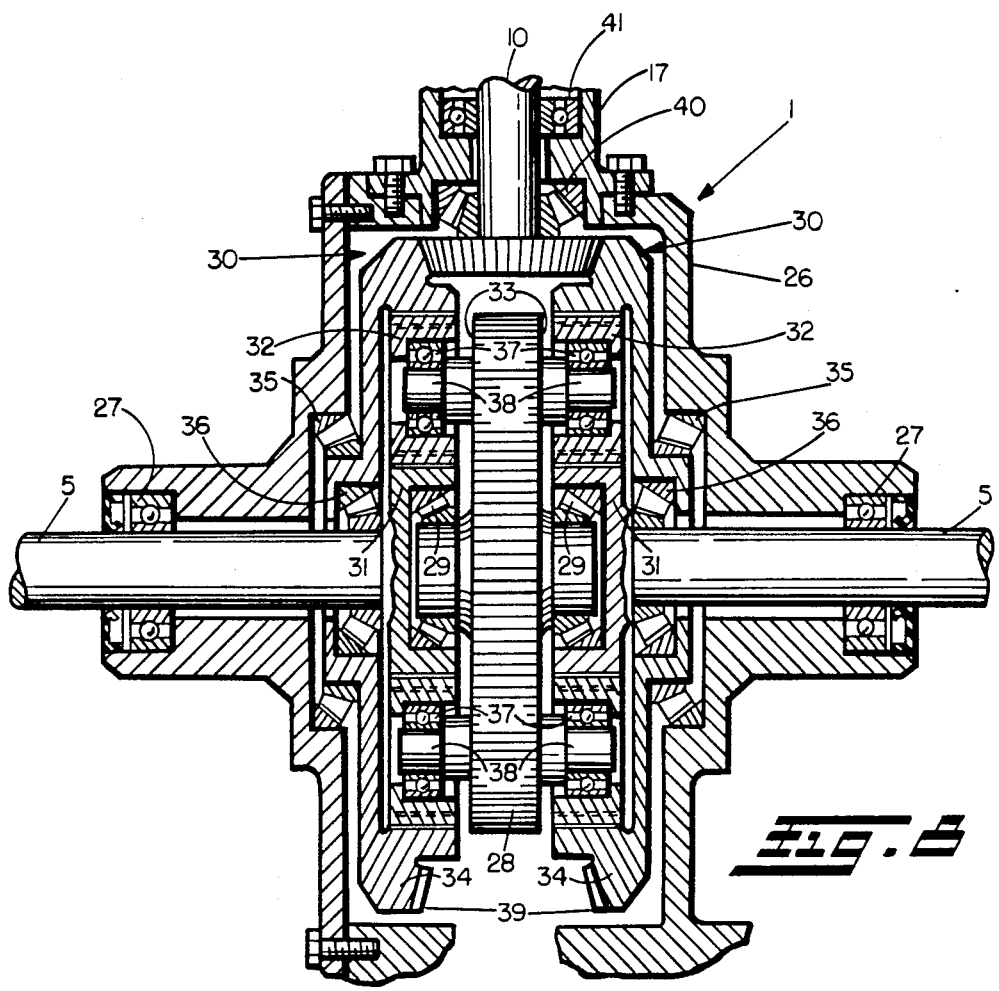

In FIG. 1 the driving and steering system 1 drives and steers a tracked vehicle 2 having tracks 3 driven by sprockets 4 on output shafts 5 of the system 1. Vehicle 2 may be a tractor as shown or any two track vehicle such as a tank, bulldozer, front end loader, snowmobile, fork lift truck, mining machine, etc.

In FIGS. 2 and 3 the driving and steering system 1 drives and steers a wheeled vehicle such as a riding mower or tractor 6 (FIG. 2) or a fork lift truck 7 (FIG. 3) having a pair of wheels 8 at one end driven by the output shafts 5 and having one or two casters 9 at the other end. Instead of casters 9, another pair of wheels 8 on separate axles may be provided and driven as by chains and sprockets or bevel gearing by the respective output shafts 5 to achieve driving and steering action similar to that of FIG. 1.

The driving and steering system 1 has a steering shaft and pinion 10 (see FIGS. 4 to 8) which, when held against rotation, causes the system 1 to drive output shafts 5, sprocket 4, and tracks 3 of vehicle 2 at equal speeds (FIG. 1) and to drive the output shafts 5 and wheels 8 of vehicles 6 and 7 at equal speeds (FIGS. 2 and 3) thus to cause travel of the vehicles 2, 6 and 7 along straight paths. The steering shaft 10 when rotated in one direction or the other, as explained in detail in connection with FIGS. 7 and 8, correspondingly increases and decreases the speeds of the respective output shafts 5 thus to turn the vehicle 2, 6 and 7 in desired direction about a vertical axis midway between the tracks 3 and midway of the lengths of the tracks 3 or a vertical axis passing through the centers of the wheels 8 and midway therebetween. The turning radius of the vehicle 2, 6 or 7 is related to the travel speed of the vehicle and the turning speed of the steering shaft 10 and as the travel speed approaches zero, continued turning of the steering shaft 10 will cause the output shafts 5 to rotate in opposite directions for turning of the vehicles 2, 6 and 7 about the vertical axes mentioned above.

Figure 4:
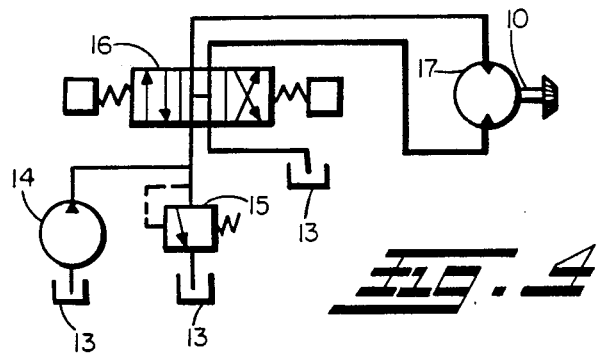
FIG. 4 is a schematic diagram of a fluid power system which assists in the turning of the steering shaft of the system by the turning of the steering wheel of the vehicle.

Each vehicle 2, 6 and 7 has a steering wheel 11 which through a shaft 12 is operatively connected to the steering shaft 10. In order to provide power-assist in the turning of the steering wheel 11 a hydraulic system as shown in FIG. 4 may be employed comprising a reservoir 13, an engine driven pump 14, a relief valve 15, a directional control valve 16, and a bi-directional motor 17. The motor 17 has direct driving engagement with the steering shaft 10 but, if desired, the motor 17 may be located laterally of shaft 10 utilizing a suitable drive such as belt, chain, spur gear or worm gear drive. The valve 16 is preferably a three-position, four-way valve of the sliding spool type, rotary spool type or poppet type having two operating positions for selectively conducting fluid under pressure delivered by pump 14 to rotate the rotor and steering shaft 10 of the motor 17 in desired direction.

Valve 16 as shown in FIG. 5 is a three-position four way sliding spool valve in which the spool 18 has threaded engagement with the steering wheel shaft 12 and is axially slidably keyed to the shaft 12', the latter having driving engagement with the rotor, i.e. the steering shaft 10 of motor 17. A torsion spring 19 in the form of an elongated slender rod has its ends fixed to the shafts 12 and 12'. When the steering wheel 11 and shaft 12 is turned in either direction with respect to shaft 12', the interengaged threads of shaft 12 and spool 18 will cause axial shifting of the spool 18 from neutral position as shown in FIG. 5 to selected operating position thus to energize motor 17 to drive the steering shaft 10 in selected direction for steering of the vehicle 2, 6 or 7.

A key 20 on shaft 12 extends radially into a keyway 21 in shaft 12' with sufficient circumferential play to permit turning of shaft 12 relative to shaft 12' in opposite directions to shift spool 18 axially to either full flow operating position and to limit the amount of twisting of the spring 19. Turning of shaft 12 relative to shaft 12' twists the torsion spring 19 so that when turning of the steering wheel 11 and shaft 12 is stopped, the energy stored in spring 19 will be released by slight continued turning of shaft 12' and spool 18 whereby the threads of spool 18 and shaft 12 will shift spool 18 to neutral position to de-energize motor 17.

FIG. 6 illustrates a modification wherein the lower end of shaft 12' is rotatably supported in the upper end of the rotor (steering shaft 10) of motor 17 which has affixed thereto a clutch member 22. A fixed clutch member 23 is axially spaced from clutch member 22, and a movable clutch member 24 is axially slidably splined to shaft 12' for movement by actuator 25 into engagement with clutch member 22 for power-assisted steering as described with reference to FIG. 5. When the actuator 25 shifts clutch member 24 into engagement with clutch member 23, the shaft 12' will be locked against rotation and thus the turning of steering wheel 11 and shaft 12 will shift the spool 18 from neutral position to selected operating position to energize motor 17 in desired direction for power steering without manual assist. After the vehicle 2, 6 or 7 has made the desired turn, the steering wheel 10 and shaft 12 are returned with the assistance of spring 19 to shift the spool 18 to neutral position to de-energize motor 17.

Referring now to FIG. 7 the driving and steering system 1 comprises a housing 26 in which the oppositely extending output shafts 5 are rotatably supported by bearings 27. Between the axially inner ends of the output shafts 5 is a power-driven member 28 which may be a chain-driven sprocket as shown or a belt-driven sheave, or a bevel gear driven by a bevel pinion, or a worm driven worm wheel from the vehicle transmission, the member 28 being rotatably supported on the output shafts 5 by bearings 29.

Straddling the power-driven member 28 are two planetary gear sets 30, each comprising a sun gear element 31 driven in turn by the power-driven member 28, a planet gear 32-carrier 33 element in driving engagement with the associated output shaft 5, and a ring gear element 34 supported for rotation in the housing 26 by bearing 35 which together with bearing 36 provides additional support for the associated output shaft 5 axially spaced from bearing 27 and bearing 29. The planet gears 32, usually three or four in number, are rotatably supported by bearings 37 on stub axles 38 projecting laterally from carrier element 33. The teeth of the planet gears 32 mesh with the teeth of the sun gear and ring gear elements 31 and 34.

The ring gear elements 34 have peripheral bevel gears 39 which mesh with the steering shaft and pinion 10, the latter constituting the rotor of motor 17 and being rotatably supported as by bearings 40 and 41.

When the steering shft 10 is held against rotation when motor 17 is de-energized, both ring gear elements 34 will be held against rotation whereby driving of the power-driven member 28 will result in driving of the output shafts 5 at equal speeds for straight line propulsion of the vehicles 2, 6 and 7.

When the steering shaft 10 is rotated in either direction by energization of motor 17, the ring gear elements 34 will be rotated in opposite directions to increase the speed of one output shaft 5 and to correspondingly decrease the speed of the other output shaft 5 thereby to cause turning of the vehicles 2, 6 and 7 as previously explained.

The driving and steering system 1 shown in FIG. 8 is similar to that of FIG. 7 except that the power-driven member 28 carries both planet gear 32-carrier 33 elements and that the sun gear elements 31 drive the respective output shafts 5. When the steering shaft 10 is held against rotation, the ring gear elements 34 are locked against rotation whereby driving of the power-driven member 28 rotates both planet gear-carrier elements 32-33 to drive the respective sun gear elements 31 and output shafts 5 at equal speeds for straight line propulsion of the vehicles 2, 6 and 7. When the steering shaft 10 is rotated in either direction, the ring gear elements 34 will be rotated in opposite directions to increase the speed of one output shaft 5 and to correspondingly decrease the speed of the other output shaft 5 thereby to cause turning of the vehicles 2, 6 and 7.

Figure 9:
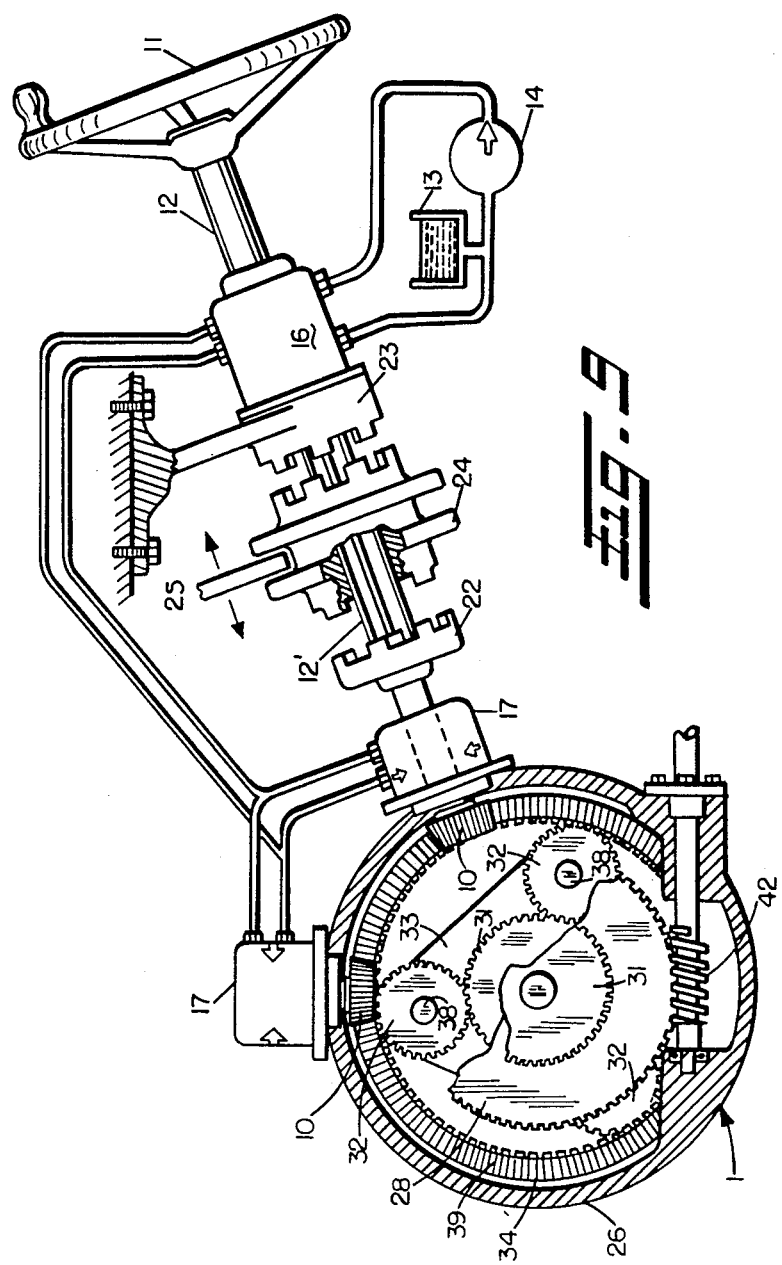
FIG. 9 illustrates a driving and steering system including FIGS. 6 and 7, for example, and additionally showing a second steering shaft and bi-directional fluid motor for high torque applications and reduced steering gear tooth loads.

The driving and steering system 1 of FIG. 9 combines FIGS. 6 and 7 and provides circumferentially spaced apart bi-directional fluid motors 17 and steering shafts 10 for high torque applications and decreased tooth loads between the bevel pinions of the steering shafts 10 and the bevel gears 39 of the ring gear elements 34. In FIG. 9 the power-driven member 28 is a worm wheel driven by worm 42 from the vehicle engine or transmission.

In summary, therefore, it can be seen that the present invention provides a compact, efficient, and lightweight driving and steering system for tracked or wheeled vehicles.

What is claimed is:

1. A driving and steering system for a vehicle having at least two propelling means comprising a housing between said propelling means; coaxial output shafts rotatably supported by said housing for driving the respective propelling means; a power-driven member coaxially between said output shafts and rotatably supported by the latter; a pair of planetary gear sets in said housing coaxial with and straddling said power-driven member; each planetary gear set comprising a ring gear element rotatably supported in said housing, a sun gear element, and a planet gear-carrier element having planet gears meshing with both said ring gear and sun gear elements; said planetary gear sets having the same one of said sun gear and planet gear-carrier elements in driving engagement with said power-driven member, and having the other one of said sun gear and planet gear-carrier elements in driving engagement with the respective output shafts; and a steering shaft rotatably supported by said housing and operatively connected to said ring gear elements to retain said ring gear elements against rotation for straight line propulsion of the vehicle and to rotate said ring gear elements in opposite directions thereby to correspondingly increase and decrease the speeds of said output shafts and propelling means for turning of the vehicle; each output shaft being rotatably supported by axially spaced apart bearing means between said shaft and said housing, between said shaft and said ring gear element, and between said ring gear element and said housing.

2. The system of claim 1 wherein said same one of said sun gear and planet gear-carrier elements are said sun gear elements.

3. The system of claim 1 wherein said same one of said sun gear and planet gear-carrier elements are said planet gear-carrier elements.

4. The system of claim 1 wherein said vehicle has a steering wheel and steering wheel shaft; wherein a bi-directional fluid motor is operatively connected to said steering shaft; wherein an extension of said steering wheel shaft has driving engagement with said steering shaft and has a limited rotary lost-motion spring connection with said steering wheel shaft; wherein a directional control valve in fluid communication with said motor and with a pump driven by the engine of the vehicle is operatively interconnected to said steering wheel shaft and said extension to energize said motor to rotate said steering shaft in desired direction responsive to turning of said steering wheel and steering wheel shaft in desired direction with respect to said extension as permitted by said limited rotary lost-motion spring connection and responsive to continued turning of said steering wheel shaft and said extension in unison, said lost-motion spring connection being operative upon stopping of continued turning of said steering wheel and steering wheel shaft to operate said valve to de-energize said motor.

5. The system of claim 4 wherein a clutch mechanism has a first clutch member fixed to said steering shaft, a second fixed clutch member axially spaced from said first clutch member, a shiftable clutch member axially slidably keyed on said extension, and an actuator engaged with said shiftable clutch member to selectively shift the latter into engagement either with said first clutch member to constitute the aforesaid driving engagement of said extension with said steering shaft or with said second fixed clutch member to hold said extension against rotation whereby turning of said steering wheel and steering wheel shaft in either direction is restricted to that permitted by said limited rotary lost-motion spring connection for operation of said valve to energize said motor, said lost-motion spring connection being operative to assist in returning said steering wheel and steering wheel shaft to a position operating said valve to de-energize said motor.

6. The system of claims 4 or 2 wherein another steering shaft is rotatably supported by said housing and operatively connected to said ring gear elements in circumferentially spaced relation to said first-mentioned steering shaft; and wherein another bi-directional fluid motor is operatively connected to said another steering shaft and is in fluid communication with said directional control valve whereby both motors are energized to rotate both steering shafts responsive to turning of said steering wheel and steering wheel shaft.

7. The driving and steering system of claim 4 wherein said propelling means in the case of a wheeled vehicle comprises at least two coaxial wheels at one end of the vehicle and at least one caster at the other end of the vehicle.

8. The driving and steering system of claim 4 wherein said propelling means in the case of a tracked vehicle comprises at least two track driving sprockets.

* * * * *